United States Patent
Bullock

(10) Patent No.: US 6,810,898 B2
(45) Date of Patent: Nov. 2, 2004

(54) HOSE ACCESS PORT FOR RECREATIONAL VEHICLES AND TRAILERS

(75) Inventor: Kay L. Bullock, Provo, UT (US)

(73) Assignee: Kay A. Bullock, Provo, UT (US)

( * ) Notice: Subject to any disclaimer, the term of this patent is extended or adjusted under 35 U.S.C. 154(b) by 6 days.

(21) Appl. No.: 10/409,568

(22) Filed: Apr. 7, 2003

(65) Prior Publication Data

US 2003/0209270 A1 Nov. 13, 2003

Related U.S. Application Data

(60) Provisional application No. 60/370,285, filed on Apr. 5, 2002.

(51) Int. Cl.[7] .............................. E03D 1/00; B65H 75/36
(52) U.S. Cl. ................................ 137/15.09; 137/15.16; 137/240; 137/355.16; 134/186; 4/323; 285/412
(58) Field of Search ........................... 137/15.09, 15.16, 137/240, 355.16; 134/186; 4/323; 285/412

(56) References Cited

U.S. PATENT DOCUMENTS

| 3,712,331 | A | * | 1/1973 | Otto ....................... 137/355.16 |
| 3,811,462 | A | * | 5/1974 | Feliz ........................... 137/240 |
| 3,981,323 | A | * | 9/1976 | Watson ........................ 137/899 |
| 4,319,366 | A | * | 3/1982 | Baker et al. ..................... 4/323 |
| 4,527,295 | A | * | 7/1985 | Lacore ........................... 4/321 |
| 4,550,453 | A | * | 11/1985 | Norman ......................... 4/323 |
| 4,667,351 | A | * | 5/1987 | Williams ......................... 4/323 |
| 5,141,017 | A | | 8/1992 | Trottier |
| 5,206,962 | A | | 5/1993 | Thorwaldson |
| 5,588,459 | A | | 12/1996 | Ellis |
| 5,678,597 | A | * | 10/1997 | Tuomela et al. ............. 137/360 |
| 6,029,707 | A | * | 2/2000 | Couch ......................... 137/899 |
| 6,427,715 | B1 | | 8/2002 | Brockington et al. |

* cited by examiner

Primary Examiner—A. Michael Chambers
(74) Attorney, Agent, or Firm—Thorpe North & Western, LLP

(57) ABSTRACT

A method and apparatus providing a hose access port for a mobile unit configured to provide access for a hose through an exterior wall to extend to a toilet for flushing a holding tank. The hose access port includes a hose-holding duct portion, an outside-mountable flange and a sleeve member. The hose-holding duct portion includes a bore extending between opposite first and second end portions of the duct portion and operable to extend through a hole formed in the exterior wall between an outside surface and an inside surface of the exterior wall proximate the toilet in the mobile unit. The outside-mountable flange extends orthogonally from the first end portion of the duct portion and is operable to be secured against the outside surface of the exterior wall. The sleeve member includes securing structure and is coupled around the second end portion of the duct portion. The sleeve member includes an inside-mountable flange extending orthogonally from the duct portion and is operable to be secured against the inside surface of the exterior wall. With this arrangement, the duct portion is operable to receive the hose through the bore into the toilet to run water therethrough and flush the holding tank.

21 Claims, 3 Drawing Sheets

HOSE ACCESS PORT FOR RECREATIONAL VEHICLES AND TRAILERS

Priority is hereby claimed to U.S. Provisional Patent Application serial No. 60/370,285 filed on Apr. 5, 2002.

BACKGROUND OF THE INVENTION

1. Field of the Invention

The present invention relates generally to flushing-out holding tanks for recreational vehicles and traveling trailers. More particularly, the present invention relates to a hose access port for easy access to bathroom facilities in a recreational trailer or traveling trailer to flush-out the holding tank therein.

2. State of the Art

Mobile units such as, recreational vehicles ("RVs"), motor homes, traveling trailers, campers and the like typically include bathroom facilities and are generally equipped with sewage holding tanks. Such holding tanks are cleaned-out and drained from time-to-time as convenient such as when parked at camping grounds or other facilities providing sewage disposal units and hook-ups. Generally, the mobile unit is equipped with a flexible sewage line for attaching to the holding tank outlet at one end and the other end attached to a septic tank or positioned where the sewage from the holding tank can be properly disposed as desired. A valve on the holding tank can then be opened to allow the sewage and the like to drain from the holding tank through the sewage line for proper disposal. Although the bulk of the sewage is drained from the holding tank during such removal, often residue and portions of the sewage will remain on the interior surface of the holding tank. Such residue and portions of sewage leave an offensive odor which often escapes the holding tank through the toilet and into the trailer.

One practice often conducted to better clean the holding tank and prevent the offensive odor from becoming unbearable is a flushing-out process. This practice is typically employed by manually pulling a garden-type hose through the door of the trailer or motor home to the bathroom and then using water supplied by the hose to fill and flush-out the holding tank. Such flushing-out process is often repeated until the offensive odor is removed. Although the offensive odor may be removed in this process, often the garden hose pulled through the mobile unit to the bathroom facility is dirty with mud and debris. As such, after completing the task of flushing-out the holding tank, another discouraging task is often necessary of cleaning out the trailer of the mud and/or debris brought in by the hose. This is often very undesirable as many mobile units have plush interiors with carpet which owners would rather not become soiled in the process of cleaning their sewage holding tanks.

SUMMARY OF THE INVENTION

The present invention relates to a method and apparatus providing a hose access port for a mobile unit configured to provide access for a hose through an exterior wall to extend to a toilet for flushing a holding tank. The hose access port includes a hose-holding duct portion, an outside-mountable flange and a sleeve member. The hose-holding duct portion includes a bore extending between opposite first and second end portions of the duct portion and operable to extend through a hole formed in the exterior wall between an outside surface and an inside surface of the exterior wall proximate the toilet in the mobile unit. The outside-mountable flange extends orthogonally from the first end portion of the duct portion and is operable to be secured against the outside surface of the exterior wall. The sleeve member includes securing structure and is coupled around the second end portion of the duct portion. The sleeve member includes an inside-mountable flange extending orthogonally from the duct portion and is operable to be secured against the inside surface of the exterior wall. With this arrangement, the duct portion is operable to receive the hose through the bore into the toilet to run water therethrough and flush the holding tank.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

While the specification concludes with claims particularly pointing out and distinctly claiming that which is regarded as the present invention, the advantages of the invention may be ascertained from the following description of the invention when read in conjunction with the accompanying drawings, in which:

DETAILED DESCRIPTION

Figure 1:
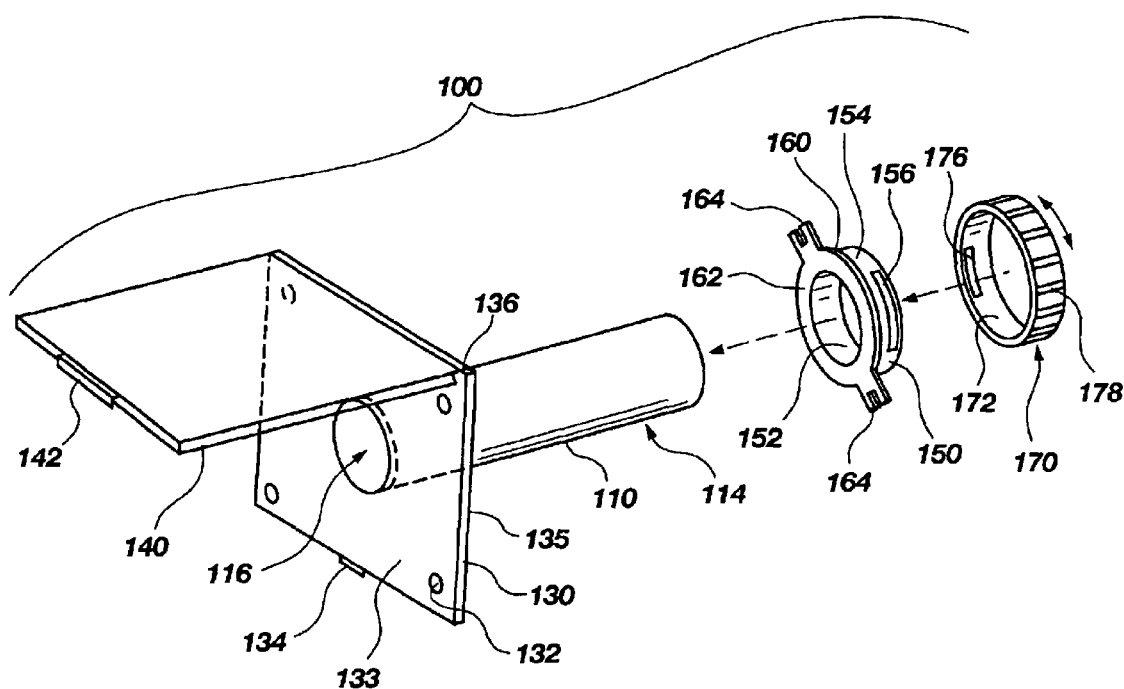
FIG. 1 illustrates an exploded perspective view of the hose access port, depicting various components of a duct portion and outside-mountable flange, a sleeve member and a cap, according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 2:
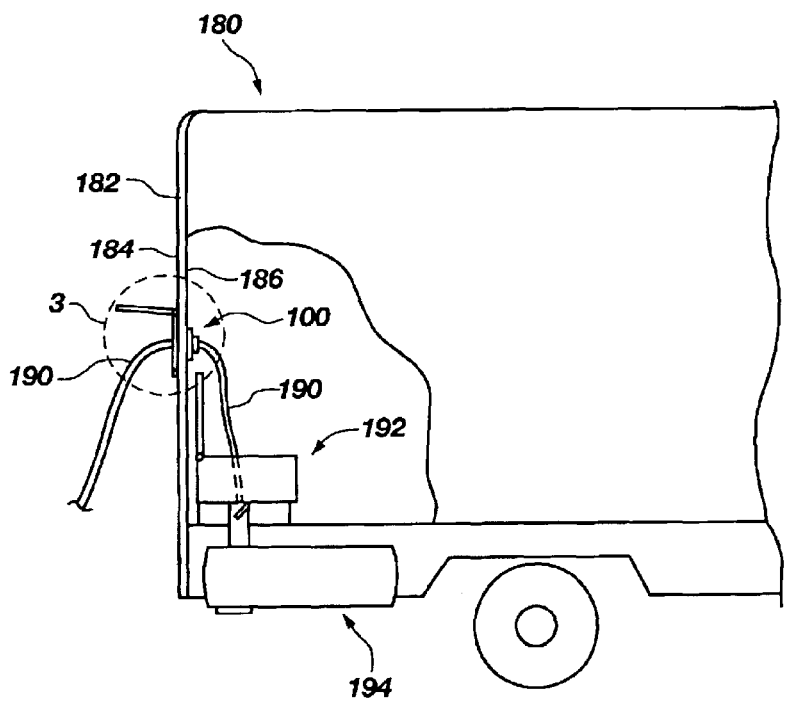
FIG. 2 illustrates a partial side view of a mobile unit with portions removed showing a simplified view of a bathroom facility, depicting the hose access port installed in an exterior wall of the mobile unit with a hose extending through the hose access port into a toilet in the mobile unit.

FIGS. 1 and 2 illustrate a hose access port 100 configured to be positioned in an exterior wall 182 of a mobile unit 180. The term "mobile unit" can include, but is not limited to, any one of a recreational vehicle ("RV"), motor home, traveling trailer, camper and the like that includes bathroom facilities with a holding tank 194. The hose access port 100 of the present invention is configured to be positioned in the exterior wall 182 proximate the bathroom facilities and more specifically, proximate a toilet 192 in the mobile unit 180. Such hose access port 100 provides easy access for an end of a hose 190, such as a garden hose, to be inserted through the access port 100 and positioned into the toilet 192 to run water into the holding tank 194. In this manner, the holding tank 194 can be flushed-out without having to pull the hose 192 through the mobile unit 180 and potentially having to clean the mobile unit 100 from the dirt and debris brought in by such hose 192. Such a hose access port 100 can be formed from any suitable material or combination of materials, such as polymeric-type materials, fiberglass, steel, aluminum, or any other suitable material that is easy to manufacture and durable.

Figure 3:
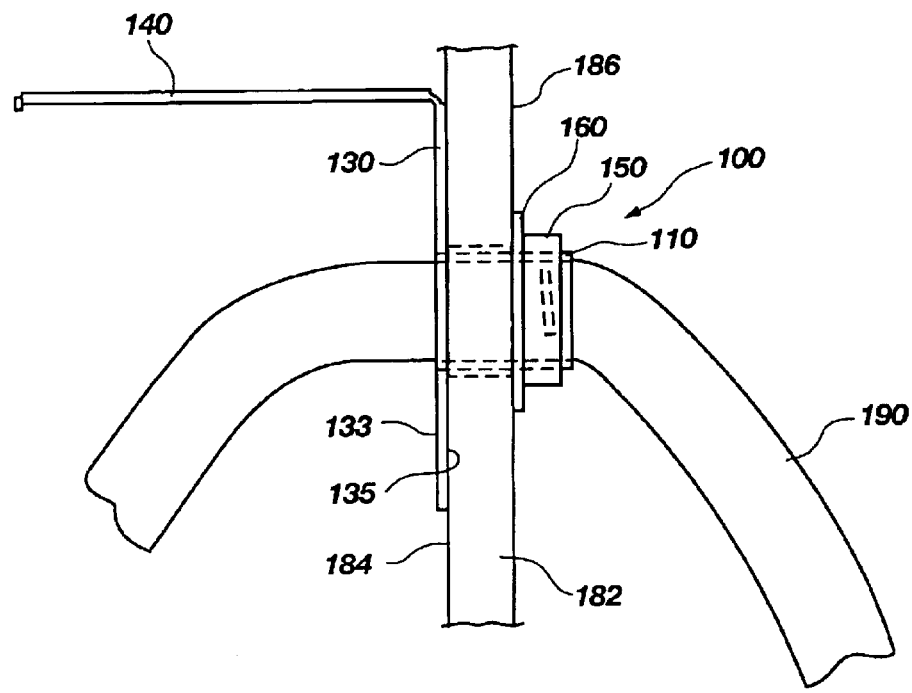
FIG. 3 illustrates an enlarged side view of the hose access port taken from the encircled section of reference 3 in FIG. 2.

With reference to FIGS. 1, 2 and 3, the hose access port 100 can include a duct portion 110 with an outside-mountable flange 130 extending from an end thereof. The duct portion 110 includes a bore 116 extending between opposite first and second end portions 112 and 114 of the duct portion 110. The bore 116 in the duct portion 110 is sized and configured to insert and hold a hose 192, such as a garden hose. Such a duct portion 110 can be a tubular configuration with a circular shaped cross-section or any other suitable shape, such as a square cross-section. The duct portion 110 is configured to be disposed in and extend through an exterior wall of the mobile unit 100 between an outside surface 184 and an inside surface 186 of the exterior wall 182. With this arrangement, the first end portion 112 of the duct portion 110 is positioned adjacent the outside surface 184 of the exterior wall 182 and the second end portion 114 is positioned adjacent the inside surface 186 of the exterior wall 182.

The outside-mountable flange 130 extends integrally and orthogonally from the first end portion 112 of the duct portion 110. The outside-mountable flange 130 can extend outward from the duct portion 110 to a square periphery or any other suitable shaped periphery, such as a circular periphery. The outside-mountable flange 130 includes a front side 133 and a back side 135 with the bore 116 of the duct portion 110 exposed and viewable at the front side 133. The outside-mountable flange 130 can also include openings 132 extending through the flange 130 and configured to receive fasteners (not shown) therethrough for mounting the flange 130 to the exterior wall 182. With this arrangement, the back side 135 of the outside-mountable flange 130 is configured to be positioned and secured against the exterior wall 182 of the mobile unit 180 with the duct portion 110 extending through the exterior wall 182.

The outside-mountable flange 130 also can include an extension portion 136 along a portion of a periphery of the flange 130. Such an extension portion 136 can extend to a closure member 140 configured to be moveable downward over the outside-mountable flange 130. The closure member 140 can include a latch portion 142 configured to correspond and latch with an interference fit over a nub 134 disposed on a portion of the outside-mountable flange 130. Such closure member 140 can be sized and configured to cover the entire outside-mountable flange 130 or, alternatively, can be sized and configured to cover the bore 116 exposed on the front side 133 of the outside-mountable flange 130. The extension portion 136 can provide a spring-loaded configuration so that when the closure member 140 is in the un-latched position the closure member 140 is suspended in an up-right position. Such up-right position exposes the bore 116 in the front side 133 of the outside-mountable flange 130 to facilitate easy access of the hose 190 through the bore 116.

The hose access port 100 also can include a sleeve member 150 and a cap 170 each configured to be disposed around the second end portion 114 of the duct portion 110. Such a sleeve member 150 can include securing structure operable to secure the sleeve member 150 to the duct portion 110 and/or the inside surface 186 of the exterior wall 182. The securing structure is operable to substantially stabilize the duct portion 110 and prevent the duct portion 110 from moving longitudinally in the exterior wall 182. As such, the sleeve member 150 can include an inside surface 152 and an outer surface 154. The inside surface 152 is sized and configured to be disposed around and coupled to the second end portion 114 of the duct portion 110. Such inside surface 152 can be, for example, annular to correspond with and fit around, for example, a circular cross-section of the duct portion 110. The outer surface 154 of the sleeve member 150 can include a threaded portion 156 disposed thereon configured to receive and secure a cap 170 around the sleeve member 150 to enclose the bore 116 at the second end portion 114.

The sleeve member 150 also can include an inside-mountable flange 160 extending integrally with and substantially orthogonal from the sleeve member 150 and/or configured to extend substantially orthogonal with respect to the duct portion 110. Such inside-mountable flange 160 includes a back surface 162 configured to be positioned and abut against the inside surface 186 of the exterior wall 182. In this manner, the duct portion 110 exposed through the exterior wall 182 is configured to receive the sleeve member 150 around the second end portion 114 with the inside-mountable flange 160 positioned against the inside surface 186 of the exterior wall 182. The inside-mountable flange 160 can be secured to the inside surface 186 of the exterior wall 182 via securing portions 164 disposed in the inside-mountable flange 160. The securing portions 164 can extend outward from the flange 160 and/or be defined within the flange 160. The securing portions 164 can be in a common plane as the inside-mountable flange 160. With this arrangement, the cap 170 can be removably coupled to the sleeve member 150 to cover the bore 116 at the second end portion 114 of the duct portion 110.

Figure 4:
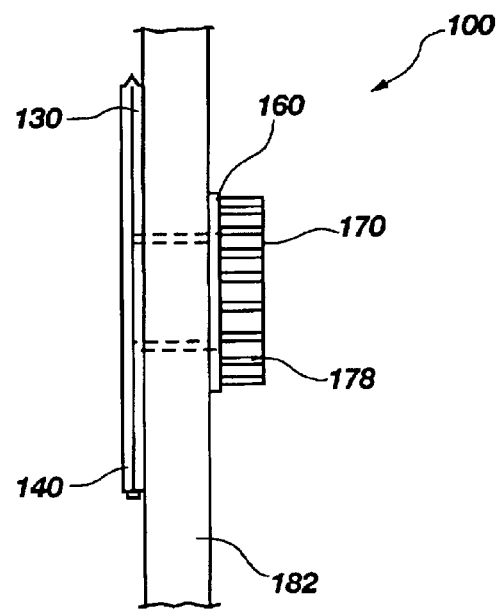
FIG. 4 illustrates a side view of the hose access port, depicting a cap and a closure member configured to enclose the hose access port.

With respect to FIGS. 1 and 4, the hose access port 100 includes the previously described cap 170 that provides closure to the hose access port 100 on the inside of the mobile unit when, for example, the hose access port 100 is not in use. Such a cap 170 can include a threaded portion 176 on a surface 172 thereof. The threaded portion 176 of the cap 170 can be sized to correspond to a threaded configuration of the thread portion 156 of the sleeve member 150. In this manner, the cap 170 can be attached and removed by, for example, rotating the cap 170 in respective clockwise and counter-clockwise directions as known in the art. When the cap 170 is in the attached position, the cap 170 can be configured to be disposed around the sleeve member 150 for aesthetic purposes. Further, the cap 170 can include grip contours 178 on an outside surface thereof to facilitate easy tightening and removing of the cap 170 with respect to the sleeve member 150. When the cap 170 is removed from the sleeve member 150 and the closure member 140 is opened on the outside, the bore 116 at each of the respective second and first end portions 112 and 114 of the duct portion 110 is exposed to allow a hose 190 to fit therethrough, as previously described with respect to FIG. 3.

Figure 5:
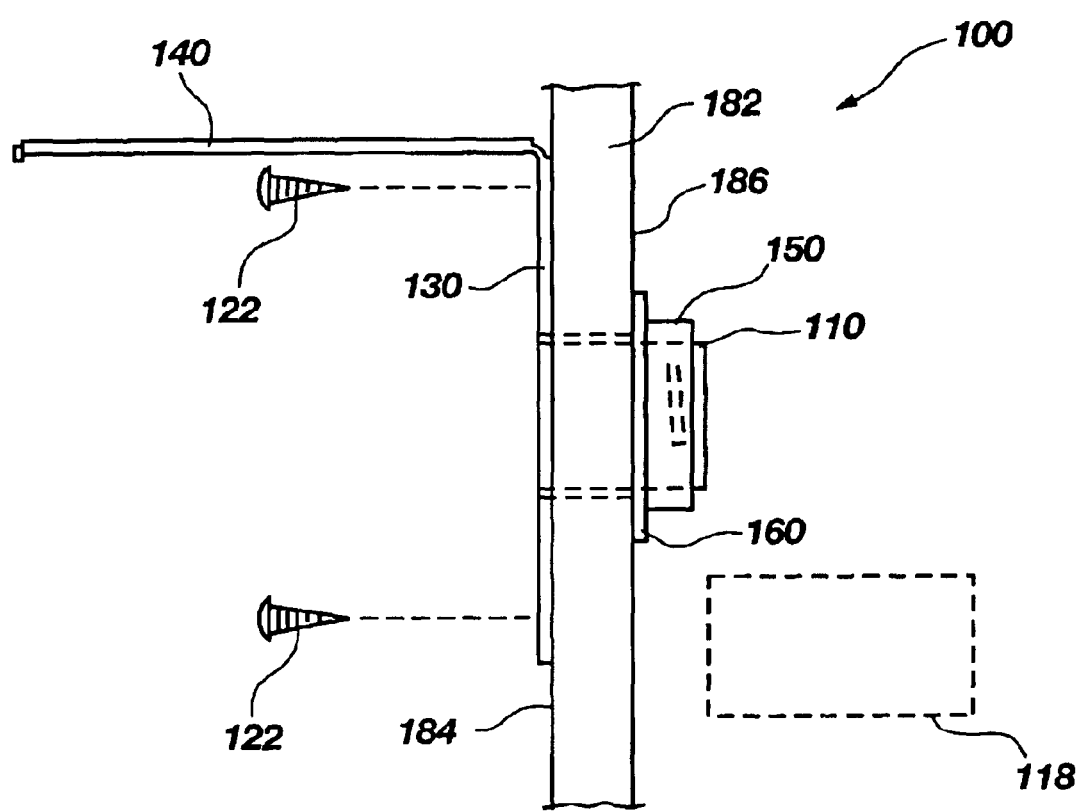
FIG. 5 illustrates a side view of the hose access port, depicting a method of installing the hose access port in the exterior wall of the mobile unit, according to an embodiment of the present invention.

With respect to FIG. 5, the hose access port 100 can readily be installed in the exterior wall 182 of the mobile unit. Such installation can be employed by first determining the position in the exterior wall 182 for the hose access port 100. As previously set forth, such position is preferably proximate the toilet in the bathroom facility of the mobile unit. The installer can then drill a hole 188 in the exterior wall 182 at a desired position with, for example, a power drill. Such hole 182 should be sized with a diameter slightly larger than the width of the duct portion 110 so that the duct portion 110 can longitudinally extend through the hole 188.

At this juncture, the duct portion 110 should be placed through the hole 188 so that the back side 135 of the outside-mountable flange 130 is positioned against the outside surface 184 of the exterior wall 180. The sleeve member 150 can then be placed over the second end portion 114 of the duct portion 110 so that the inside-mountable flange 160 abuts against the inside surface 186 of the exterior wall 182. The duct portion 110 is formed with an excess length 118 to compensate for variations of thicknesses in the exterior walls of different types of mobile units. As such, the installer can then mark the exposed portion of the duct portion 110. The duct portion 110 can then be removed and cut at the mark, discarding the excess length 118 of the duct portion 110, to thereby, provide a duct portion 110 with a customized length sized for the particular mobile unit prepared to receive the hose access port 100.

The duct portion 110 can then be reinserted in the hole 188 in the exterior wall 182, positioning the sleeve member 150 over the second end portion 114 of the duct portion 110 so that the outside-mountable flange 130 and the inside-mountable flange 160 are positioned against the respective outside and inside surfaces 184 and 186 of the exterior wall 182. The installer can then secure the outside-mountable flange 130 to the outside surface 184 with fasteners 122 or any other suitable fastening means, such as adhesive. Such fasteners 122 can be inserted through the openings 132 (FIG. 1) to secure the hose access port 100 to the exterior wall 182. The installer can then slide the sleeve member 150 over the second end portion 114 of the duct portion 110 and secure the inside-mountable flange 160 to the inside surface 186 of the exterior wall 182. Such can be employed, for example, by inserting fasteners (not shown) through the securing portions 164 (FIG. 1) of the inside-mountable flange 160 into the inside surface 186 of the exterior wall 182. Alternative methods of securing the inside-mountable flange 160 to the inside surface 186 can be employed as known to one of ordinary skill in the art. For example, the installer can also dispose adhesive around the inside surface 152 of the sleeve and the outside surface of the duct portion 110 to adhesively attach the sleeve member 150 to the duct portion 110 so that the inside-mountable flange 160 is secured against the inside surface 186 of the exterior wall 182. With this arrangement, the hose access port 100 can be readily installed in the exterior wall 182 of a mobile unit with most any sized thickness. As such, the hose access port 100 provides easy access to the bathroom facilities of the mobile unit to facilitate insertion of a hose 190, such as a garden hose, for positioning into the toilet to run water therethrough and flush-out the holding tank when desired.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method of installing a hose access port in an exterior wall of a mobile unit, the method comprising:

forming a hole in the exterior wall of the mobile unit;

extending a duct portion through the hole so that an outside-mountable flange is positioned against an outside surface of the exterior wall;

positioning a sleeve member over an exposed portion of the duct portion on an inside surface of the exterior wall so that an inside-mountable flange extending from the sleeve member is positioned against the inside surface of the exterior wall;

marking the exposed portion of the duct portion with a mark;

cutting the duct portion at the mark to remove an excess length of the duct portion; and securing the outside-mountable flange and the inside-mountable flange to the respective outside surface and the inside surface of the exterior wall to secure the duct portion in the exterior wall operable to hold a hose extending through the duct portion to run water into a toilet for flushing-out a holding tank in the mobile unit.

2. The method of claim 1, wherein said securing comprises securing the outside-mountable flange and the inside mountable flange with fasteners extending into the respective outside surface and the inside surface of the exterior wall.

3. The method of claim 1, wherein said securing comprises securing the inside-mountable flange to the duct portion with adhesive with the inside-mountable flange positioned against the inside surface of the exterior wall.

4. The method of claim 1, wherein subsequent to said marking comprises removing the duct portion from the exterior wall to perform said cutting.

5. The method of claim 1, wherein said positioning comprises sliding the sleeve member over the exposed portion of the duct portion so that the sleeve member moves toward the inside surface of the exterior wall along a longitudinal length of the exposed portion.

6. A method of making a hose access port for a mobile unit configured to provide access for a hose through an exterior wall to extend to a toilet for flushing a holding tank, the method comprising:

forming a hose-holding duct portion having a bore extending between opposite first and second end portions of the duct portion and operable to extend through a hole formed in the exterior wall between an outside surface and an inside surface of the exterior wall proximate the toilet in the mobile unit, said duct portion being operable to receive the hose through the bore into the toilet to run water therethrough and flush the holding tank;

forming an outside-mountable flange extending orthogonally from the first end portion of the duct portion and operable to be secured against the outside surface of the exterior wall; and forming a sleeve member with securing structure configured to be coupled around the second end portion of the duct portion;

forming an inside-mountable flange extending orthogonally from the duct portion and operable to be secured against the inside surface of the exterior wall; and configuring said hose-holding duct portion to include excess length to extend longer than a thickness of the exterior wall and beyond the sleeve member coupled around the second end portion of the duct portion, said excess length of said duct portion operable to be removed from the duct portion.

7. A hose access port for a mobile unit configured to provide access for a hose through an exterior wall to extend to a toilet for flushing a holding tank, the hose access port comprising:

a hose-holding duct portion having a bore extending between opposite first and second end portions of the duct portion, said duct portion being operable to extend through a hole formed in the exterior wall between an outside surface and an inside surface of the exterior wall proximate the toilet in the mobile unit, said duct portion being operable to receive the hose through the bore into the toilet to run water therethrough and flush the holding tank;

an outside-mountable flange extending orthogonally from the first end portion of the duct portion and operable to be secured against the outside surface of the exterior wall; and a sleeve member with securing structure coupled around the second end portion of the duct portion, said sleeve member having an inside-mountable flange extending orthogonally from the duct portion and operable to be secured against the inside surface of the exterior wall.

8. The hose access port of claim 7, wherein said securing structure comprises the inside-mountable flange and is operable to substantially stabilize the duct portion in the exterior wall.

9. The hose access port of claim 7, further comprising a cap operatively coupled to the second end portion of the duct portion and operable to cover the bore at the second end portion of the duct portion.

10. The hose access port of claim 7, wherein said sleeve member is sized and configured to be positioned around the second end portion with an interference fit.

11. The hose access port of claim 7, wherein said sleeve member is operable to be coupled to a cap to cover the bore at the second end portion of the duct portion.

12. The hose access port of claim 11, wherein said sleeve member includes a threaded portion configured to correspond with a threaded configuration formed on the cap to couple the cap to the sleeve member.

13. The hose access port of claim 7, further comprising an outside closure operatively coupled to the first end portion of the duct portion and operable to cover the bore at the first end portion of the duct portion.

14. The hose access port of claim 7, wherein said duct portion comprises a tubular configuration with the bore sized and configured to hold a portion of the hose therein.

15. A flushing system comprising:
a mobile unit having an exterior wall defining a periphery of the mobile unit, said mobile unit including a toilet disposed within the mobile unit and a holding tank operatively coupled to the toilet; and
a hose access port configured to provide access for a hose through the exterior wall to extend to the toilet for flushing-out the holding tank, the hose access port including:
a hose-holding duct portion having a bore extending between opposite first and second end portions of the duct portion, said duct portion being operable to extend through a hole formed in the exterior wall between an outside surface and an inside surface of the exterior wall proximate the toilet in the mobile unit, said duct portion being operable to receive the hose through the bore into the toilet to run water therethrough and flush the holding tank;
an outside-mountable flange extending orthogonally from the first end portion of the duct portion and operable to be secured against the outside surface of the trailer wall; and
a sleeve member with securing structure coupled around the second end portion of the duct portion, said sleeve member having an inside-mountable flange extending orthogonally from the duct portion and operable to be secured against the inside surface of the trailer wall.

16. The system of claim 15, wherein said securing structure comprises the inside-mountable flange and is operable to substantially stabilize the duct portion in the exterior wall.

17. The system of claim 15, wherein said sleeve member is sized and configured to be positioned around the second end portion with an interference fit.

18. The system of claim 15, wherein said sleeve member is operable to be coupled to a cap to cover the bore at the second end portion of the duct portion.

19. The system of claim 18, wherein said sleeve member includes a threaded portion configured to correspond with a threaded configuration formed on the cap to couple the cap to the sleeve member.

20. The system of claim 15, further comprising an outside closure operatively coupled to the first end portion of the duct portion and operable to cover the bore at the first end portion of the duct portion.

21. The system of claim 15, wherein said duct portion comprises a tubular configuration with the bore sized and configured to hold a portion of the hose therein.

* * * * *